Oct. 8, 1935.  H. H. TIMIAN  2,016,694
ENGINE
Filed May 1, 1931
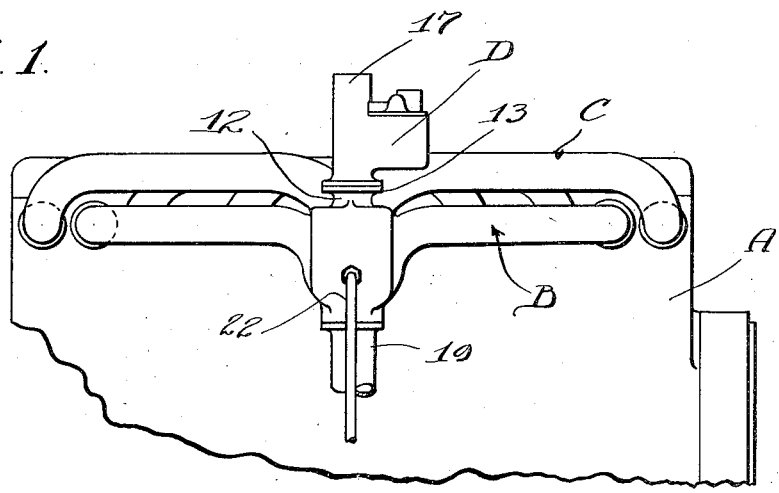
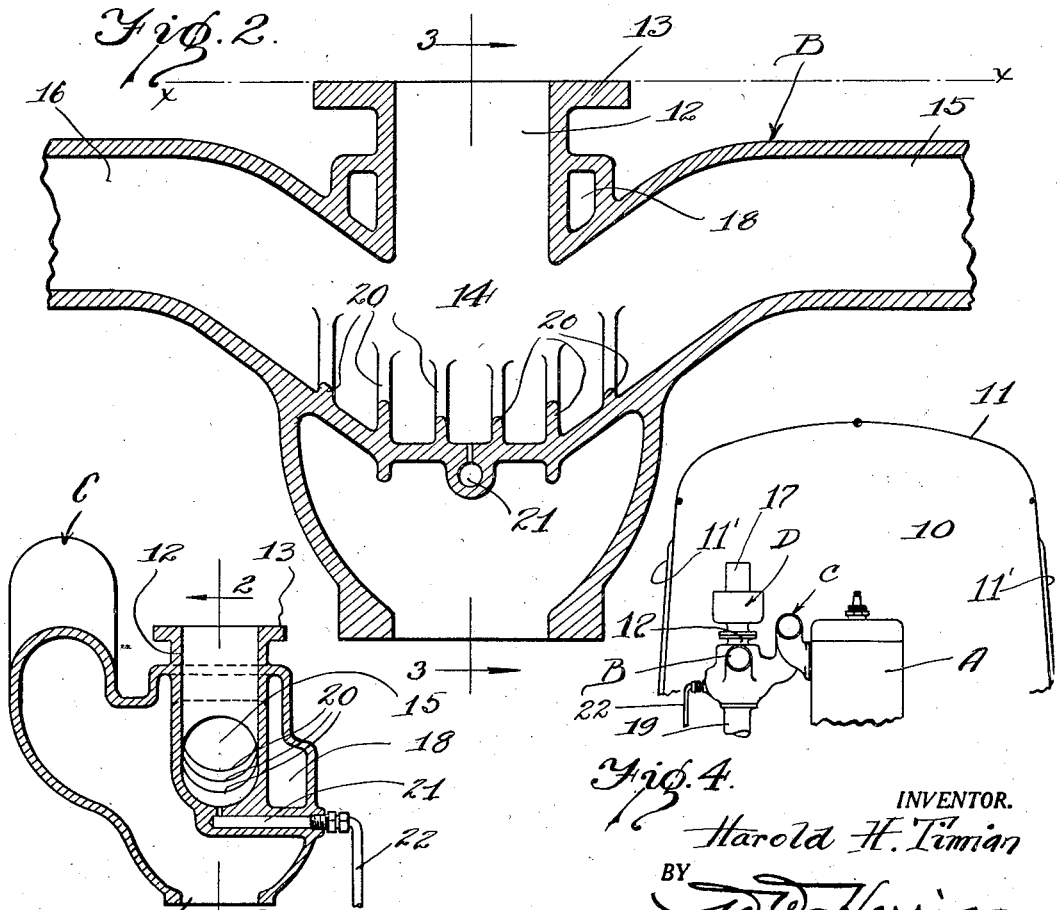

Patented Oct. 8, 1935

2,016,694

UNITED STATES PATENT OFFICE 2,016,694

ENGINE

Harold H. Timian, Detroit, Mich., assignor to Continental Motors Corporation, Detroit, Mich., a corporation of Virginia Application May 1, 1931, Serial No. 534,281

6 Claims. (Cl. 123—52)

This invention relates to internal combustion engines and especially those used in motor vehicles. The invention has further reference particularly to intake manifolds for use with down draft types of carburetors.

Heretofore the aforesaid type of carburetor has proved objectionable in that it is installed upwardly of the intake manifold above the engine in which position it draws air adjacent the top of the usual hood space enclosing the engine. The air in this locality is relatively hot since it is trapped beneath the hood and this hot air is objectionable to efficient carburetion and engine performance.

It is an object of my invention to remove the aforesaid difficulty by providing a manifold structure for down draft carburetors which structure permits the carburetor to be positioned relatively low whereby it will draw air through the hood low louvres of the engine bonnet at a relatively cool temperature compared to the temperature of the air adjacent the top of the hood space.

Further objects of my invention reside in the provision of an improved intake manifold for down draft carburetion, improving the engine performance especially with respect to power and efficiency.

Referring to the accompanying drawing illustrative of one embodiment of my invention, Figure 1 is a side elevational view of an engine showing my manifold and carburetor arrangement, Figure 2 is a sectional elevational view of the intake manifold along the line 2—2 of Figure 3, Figure 3 is a sectional elevational view along the line 3—3 of Figure 2, and Figure 4 is a diagrammatic view of the engine and enclosing hood.

In the drawing, reference character A represents an internal combustion engine having intake and exhaust manifolds B and C respectively. The engine is mounted as usual in the space 10 provided by the usual vehicle hood 11 diagrammatically represented in Figure 4.

The intake manifold B is provided with a substantially vertically extending primary fuel mixture conducting portion or riser 12 terminating at the top in a flange 13 and at the bottom in a distributing chamber 14 the latter opening oppositely to the laterally extending branches 15, 16 leading to the engine cylinders. These branches extend upwardly from the distributing chamber 14 as shown in Figure 2 whereby the riser 12 is positioned relatively low with respect to the branches 15, 16. Thus the plane X—X containing flange 13 is adjacent the tops of branches 15, 16 and the carburetor D secured to flange 13 is positioned relatively low with respect to the engine so as to locate its air intake in the lower regions of the hood space 10 preferably opposite the usual louvres 11' where it will draw relatively cool air for improved carburetion efficiency and performance.

As a further feature of my invention, the exhaust manifold B has a jacket or casing 18 wholly or partly surrounding the distributing chamber 14 with the exhaust outlet 19. In order to trap and vaporize wet fuel mixture particles the floor of chamber 14 is provided with transverse fins or ribs 20 spaced longitudinally so as to trap the particles and vaporize them by heat conducted from the chamber 18 to the ribs 20. A passage 21 may be provided for the distributing chamber, said passage opening downwardly to a suitable outlet 22 to relieve the chamber 14 in the event of carburetor flooding.

The formation of the depressed floor of chamber 14 opposite the down-draft riser 12 serves to collect the wet fuel particles, the chamber 14 being open without restriction to the free flow of the fuel mixture from riser 12 to the laterally extending branches 15 and 16 of the intake manifold B. This feature of my invention provides important improvements in the efficiency of fuel distribution for down-draft systems using gasoline and this arrangement may, of course, be employed to advantage apart from the other features of my invention as described hereinbefore.

What I claim as my invention is:

1. In an engine having a carburetor of the down draft type, an intake manifold having a riser communicating with the carburetor and extending downwardly therefrom, an intake manifold formed with a distributing chamber at the bottom of the riser, said manifold having fuel mixture distributing branches extending longitudinally of the engine in opposite directions from said distributing chamber, said branches being inclined sharply upwardly adjacent to said distributing chamber and having branch portions beyond said sharply inclined portion extending in a plane substantially above the upper limits of said distributing chamber whereby to position the carburetor relatively low with respect to the engine.

2. In an engine having a carburetor of the down draft type, an intake manifold having a riser provided with a flange at its upper end fitted to said carburetor, said riser having a fuel mixture distributing portion at the lower end thereof, said manifold having branches extending in opposite directions longitudinally of the engine from said chamber and upwardly to position the upper portions of said branches adjacent the plane containing said flange.

3. In an engine having a carburetor of the down draft type, an intake manifold having a riser communicating with the carburetor and extending downwardly therefrom, an intake manifold formed with a distributing chamber at the bottom of the riser, said manifold having fuel mixture distributing branches extending longitudinally of the engine in opposite directions from said distributing chamber and upwardly to position the upper portions of said branches adjacent the horizontal plane containing the upper end of said riser.

4. In an engine substantially enclosed in a vehicle hood, said engine having a carburetor of the down draft type, an intake manifold having a riser extending downwardly in said hood from said carburetor, said manifold having a distributing chamber and laterally oppositely extending fuel mixture conducting branches extending upwardly from said chamber to position the chamber substantially below the lower part of the branch portions adjacent to the engine, whereby to position the carburetor relatively low in said hood whereby it will be supplied with relatively cool air contrasted with the temperature of the air nearer the top of said hood.

5. In an engine substantially enclosed in a vehicle hood, said engine having a carburetor of the down draft type, an intake manifold having a riser extending downwardly in said hood from said carburetor, said manifold having a distributing chamber and laterally oppositely extending fuel mixture conducting branches extending sharply upwardly from said chamber to position the branch portions beyond said sharply upwardly inclined portion substantially extending in a plane above the upper limits of said chamber, whereby to position the carburetor relatively low in said hood so that it will be supplied with relatively cool air contrasted with the temperature of the air nearer the top of said hood, said hood having air conducting louvres substantially horizontally opposite the carburetor air intake.

6. In an engine having a carburetor of the down draft type, an intake manifold having a riser communicating with the carburetor and extending downwardly therefrom, an intake manifold formed with a distributing chamber at the bottom of the riser, said manifold having fuel mixture distributing branches extending longitudinally of the engine in opposite directions from said distributing chamber and upwardly whereby to position the carburetor relatively low with respect to the engine, said branches extending sharply upwardly directly from said chamber and having portions beyond said sharply upwardly extending portions positioned substantially in a plane extending above the distributing chamber.

HAROLD H. TIMIAN.